US009963225B2

United States Patent
Vallart et al.

(10) Patent No.: US 9,963,225 B2
(45) Date of Patent: May 8, 2018

(54) SYSTEM FOR CONTROLLING A ROTORCRAFT ROTOR, A ROTORCRAFT FITTED WITH SUCH A SYSTEM, AND AN ASSOCIATED CONTROL METHOD

(71) Applicant: AIRBUS HELICOPTERS, Marignane (FR)

(72) Inventors: Jean-Baptiste Vallart, Aix en Provence (FR); Romeo Byzery, Marseilles (FR)

(73) Assignee: AIRBUS HELICOPTERS, Marignane (FR)

( * ) Notice: Subject to any disclaimer, the term of this patent is extended or adjusted under 35 U.S.C. 154(b) by 221 days.

(21) Appl. No.: 15/096,366

(22) Filed: Apr. 12, 2016

(65) Prior Publication Data

US 2016/0297519 A1 Oct. 13, 2016

(30) Foreign Application Priority Data

Apr. 13, 2015 (FR) ..................................... 15 00756

(51) Int. Cl.
*B64C 27/56* (2006.01)
*B64C 13/08* (2006.01)
(Continued)

(52) U.S. Cl.
CPC .............. *B64C 27/56* (2013.01); *B64C 13/08* (2013.01); *B64C 27/58* (2013.01); *B64C 27/78* (2013.01)

(58) Field of Classification Search
CPC ......... B64C 27/56; B64C 27/58; B64C 13/08; B64C 27/78
See application file for complete search history.

(56) References Cited

U.S. PATENT DOCUMENTS 1,918,196 A 7/1933 Sebell
4,607,202 A * 8/1986 Koenig ................... B64C 27/58
244/223
(Continued)

FOREIGN PATENT DOCUMENTS

EP 2226531 9/2010
WO 0187706 11/2001

OTHER PUBLICATIONS

Notice of Preliminary Rejection for Korean Application No. 10-2016-0045063, dated Jul. 1, 2017, 2 Pages.
(Continued)

*Primary Examiner* — Christopher P Ellis
(74) *Attorney, Agent, or Firm* — Brooks Kushman P.C.

(57) ABSTRACT

A control system for controlling a rotorcraft rotor, to a rotorcraft fitted therewith, and to a corresponding control method. The system comprises selector means for defining at least two disjoint position ranges for the control member between two physical abutments corresponding to the movement limits of the control member, a first position range being defined between at least two first limit values about a zero force position of the control member, and at least one second position range being defined between at least one of the at least two first limit values and at least one second limit value; and control means for allocating a first control law to the first position range of the control member and a second control law to the second position range of the control member, the first and second control laws being selected to be mutually distinct.

16 Claims, 2 Drawing Sheets

(51) Int. Cl.
*B64C 27/58* (2006.01)
*B64C 27/78* (2006.01)

(56) References Cited

U.S. PATENT DOCUMENTS

| | | | | |
|---|---|---|---|---|
| 5,076,517 | A * | 12/1991 | Ferranti | B64C 13/04 244/223 |
| 5,559,415 | A | 9/1996 | Gregory et al. | |
| 8,594,864 | B2 | 11/2013 | Greenfield et al. | |
| 8,844,880 | B1 * | 9/2014 | Corliss | B64C 27/48 244/229 |
| 2004/0010354 | A1 * | 1/2004 | Nicholas | B64C 13/503 701/4 |
| 2005/0147495 | A1 * | 7/2005 | Bittner | B64C 27/32 416/131 |
| 2005/0173595 | A1 * | 8/2005 | Hoh | B64C 13/04 244/223 |
| 2008/0179463 | A1 * | 7/2008 | Le Bastard | B64C 27/57 244/194 |
| 2009/0266940 | A1 * | 10/2009 | Miller | B64C 13/10 244/223 |
| 2012/0255386 | A1 * | 10/2012 | Couderc | B64C 13/30 74/471 XY |
| 2013/0327896 | A1 * | 12/2013 | Mezan | G05D 1/0808 244/235 |
| 2014/0077025 | A1 * | 3/2014 | Yates | B64C 13/04 244/17.13 |
| 2014/0138492 | A1 * | 5/2014 | Van Staagen | B64C 27/56 244/228 |
| 2014/0263850 | A1 * | 9/2014 | Kerdreux | B64C 27/56 244/234 |
| 2015/0314857 | A1 * | 11/2015 | Cherepinsky | B64C 13/04 244/223 |
| 2015/0329199 | A1 * | 11/2015 | Golborne | B64C 27/04 244/196 |
| 2016/0221674 | A1 * | 8/2016 | Latham | B64C 27/64 |
| 2016/0304190 | A1 * | 10/2016 | Grohmann | B64C 13/46 |
| 2017/0017241 | A1 * | 1/2017 | Gillett, Jr. | B64C 27/56 |
| 2017/0233066 | A1 * | 8/2017 | Bredenbeck, Jr. | B64C 11/30 244/230 |
| 2017/0291690 | A1 * | 10/2017 | Litwinowicz | B64C 13/08 |

OTHER PUBLICATIONS

French Search Report for French Application No. FR 1500756, Completed by the French Patent Office on Mar. 2, 2016, 6 Pages.

* cited by examiner

SYSTEM FOR CONTROLLING A ROTORCRAFT ROTOR, A ROTORCRAFT FITTED WITH SUCH A SYSTEM, AND AN ASSOCIATED CONTROL METHOD

CROSS REFERENCE TO RELATED APPLICATION

This application claims priority to French patent application No. FR 15 00756 filed on Apr. 13, 2015, the disclosure of which is incorporated in its entirety by reference herein.

BACKGROUND OF THE INVENTION (1) Field of the Invention

This disclosure relates to a system for controlling a rotorcraft rotor.

(2) Description of Related Art

In general, control systems include control members presenting large lever arms and/or large amounts of travel between two physical abutments for the movement stroke of a control member. Specifically, in certain circumstances, the stroke of the free end of a conventional stick may be very large, e.g. more than several tens of centimeters.

Furthermore, with such conventional control members, in general use is made of only one piloting control law that is proportional in position. Under such circumstances, a position of the stick corresponds by way of example to an unvarying position of the rotor plane of the rotorcraft.

Such a mode of operation is implemented in particular for a mechanical control system in which the control member and the rotor are mechanically linked together by a plurality of cranks, rods, and swash plates.

Under such circumstances and by way of example, the large amount of travel of a stick makes it possible to cover the entire control range for the rotor and to pilot the rotorcraft with good sensitivity. For each movement of the stick, a proportional movement of the rotor takes place and the resulting response of the rotorcraft is controllable.

Furthermore, the large travel of the stick also enables a lever arm to be provided that is sufficient to counter large control forces.

Nevertheless, even with a large amount of travel, it can be found to be complex or indeed uncomfortable to keep the stick in a determined position. That is why, an assistance device, generally referred to as a "trim unit", enables the pilot to place the stick in a certain position and allow means suitable for providing a compensation force to keep the stick in that position. In the language specific to piloting rotorcraft, this function may be referred to as "anchoring the stick" or indeed "zeroing the forces" (i.e. the forces on the stick).

Thus, in order to limit the forces on the control member, electrical or optical controls have subsequently been developed, in particular such as those described in Documents WO 01/87706 and U.S. 2004/0010354 for piloting the various movements of a rotorcraft rotor, and more generally by Document EP 2 226 531 for controlling the advance of a vehicle. A computer then receives information about the positioning of the stick and then controls a proportional servo-control. Such an electrical or optical control system is thus advantageous in that it enables the control member to be mechanically decoupled from the rotor that it controls.

Nevertheless, under such circumstances, in order to cover the full range of rotor movements, the travel of control members necessarily remains very large. In particular, it is equivalent to the travel of a mechanical control member.

Such a travel amplitude thus constitutes a major constraint in the design of a cockpit and on the corresponding ergonomics. Thus, control member with large amounts of travel do not make it possible to guarantee good comfort in the cockpit.

Furthermore, the control law of the servo-control acting on the rotor when on the ground is unique and always consists in a direct law concerning position, i.e. each position of the control member corresponds to one position of the rotor. Unfortunately, such a control law is not appropriate for enabling control members of small travel to be used while also covering the entire range of movement of the rotor.

BRIEF SUMMARY OF THE INVENTION

The disclosed control system is adapted to make it possible to modify the angular orientation, i.e. the collective pitch and/or the cyclic pitch, of the blades of a main rotor or of a tail rotor, or indeed to make it possible to modify the angle of inclination of the plane of the rotor as defined at each instant by the rotary motion of the free ends of the blades of the rotor.

The disclosure also relates to a rotorcraft fitted with such a system for controlling a rotor, and to a method of controlling a rotor by means of a control member. Furthermore, below in the present application, the term "control member" is used to specify any control device suitable for being operated by a pilot or automatically whether in a cockpit, or from outside the rotorcraft when the rotorcraft does not carry a pilot. Such a control member may thus be in various forms, and in particular, firstly it may be in the form of a cyclic pitch lever or of a collective pitch stick, a "mini-stick", also known as a "joystick", for the cyclic pitch or the collective pitch, and secondly it may be in the form of pedals serving to modify the pitch angle of the blades of a tail rotor of the rotorcraft.

An object of the present invention is thus to provide a control system that makes it possible to overcome the above-mentioned limitations. The control system also makes it possible significantly to reduce the travel of a member for controlling a rotorcraft rotor, while conserving a complete range of control over the rotor and while guaranteeing good sensitivity in piloting. Furthermore, the control system in accordance with the invention enables a rotorcraft cockpit to be arranged in a novel manner, thereby guaranteeing a piloting position that is ergonomic.

The invention thus provides a control system for controlling a rotorcraft rotor, such a control system including at least one control member for use in piloting the rotor.

According to the invention, the control system is remarkable in that it comprises:

selector means for defining at least two disjoint position ranges for the control member between two physical abutments corresponding to the movement limits of the control member, a first position range being defined between at least two first limit values about a zero force position of the control member, and at least one second position range being defined between at least one of said at least two first limit values and at least one second limit value; and control means for allocating a first control law to the first position range of the control member and a second control law to the second position range of the control member, the first and second control laws being selected to be mutually distinct.

In other words, the selector means enable at least two disjoint value ranges to be defined that correspond to different positions of the control member. The first and second position ranges may also correspond to an angular movement of the free end of the control member about at least one axis of rotation.

For alternating back-and-forth movement in pivoting of the control member, such as for example controlling the collective pitch or the pedals, the first limit values are thus two in number and constitute the extreme positions for the stroke of the control member over the first position range.

Furthermore, for pivoting movement with two degrees of freedom for the control member relative to a stand, the first and second limit values are respectively each greater than two in number. These limit values then form portions of three-dimensional cones. The control member is then advantageously in the form of a member for controlling the cyclic pitch of the blades of the rotorcraft.

The selector means thus enable the two position ranges to be modified by varying the positions of the first and second limit values. In this way, the control system of the rotor is matched to the performance of the rotorcraft in order to obtain satisfactory flight quality.

The control means make it possible to allocate distinct control laws to the two position ranges of the control member. Thus, as a function of the position of the control member between the two physical abutments, the rotor is piloted in application of a first control law and in application of a second control law.

Advantageously, the control system may include monitor means serving to identify a landed state of the rotorcraft on a support.

Thus, the control system is suitable for activating at least one of the first and second control laws when the monitoring means detect that the rotorcraft is in a landed state.

Furthermore, such control means making it possible to identify a landed state may comprise at least one force sensor in order to identify at least one reaction force from the ground on at least one undercarriage of the rotorcraft.

Under such circumstances, the control system is suitable for being activated during a stage of piloting that corresponds to the rotorcraft being in a landed state. Depending on the position of the control member in the first or second position ranges, it then enables the rotorcraft to be piloted using one or the other of two control laws.

Furthermore, with the first control law being of the type that is linear in position, each position of the control member in the first position range may correspond to a position of a plane of the rotor.

In other words, in the first control law, the control acts directly on the position of the rotor as a function of the position of the control member. The same difference between the current position of the control member and the zero force position thus always corresponds to the same difference between the current position of the rotor plane and a reference position thereof.

It should be observed that the term "plane of the rotor" is used to mean the plane described by the tips of the blades of the rotor. Such a plane is also defined and arranged perpendicularly relative to a tilt axis of a rotor cone. This cone corresponds to the path followed by the blades of the rotor during rotation.

In practice, with the second control law being of the type that is linear in speed, each position of the control member in the second position range may correspond to a speed of tilt of the rotor plane. In addition, the difference between the current position of the control member and the first limit defining one of the boundaries of the second position range thus corresponds to a speed of tilt of the plane of the rotor.

Such a difference is then considered in terms of absolute value and is consequently intrinsically positive. This difference is then associated with a speed of tilt of the rotor plane that may itself be positive or negative depending on the direction in which the control member is being moved relative to the zero force position. Furthermore, it should be observed that the speed of tilt of the rotor corresponds to the time derivative of the position of the rotor plane.

Thus, the second control law acts on the speed of tilt of the rotor plane relative to a drive plane corresponding to a plane perpendicular to a rotor shaft. Such a second control law is thus particularly suitable for covering the entire control range with small deflections of the control member.

Specifically, in a particular embodiment, the second limit value may coincide with one of the two physical abutments of the control member.

Under such circumstances, the control system makes it possible to select only two position ranges. Furthermore, the second position range extends between the first position range and a physical abutment of the control member.

Advantageously, the second position range of the control member may include two range portions, each of the two range portions being defined between one of the first limit values of the first range and a second limit value, the two portions of the second position range being arranged on respective sides of the first position range of the control member.

In other words, beyond the two first limit values, corresponding to two movement directions for the control member, there exists a portion of the second position range. The second position range thus corresponds to positions that are clearly spaced apart in two opposite directions from the zero force position of the control member.

In an advantageous embodiment, the control system may include adjustment means suitable for modifying a reference position of a plane of the rotor relative to a drive plane, the reference position corresponding to an angle of inclination of the rotor when the control member is in the zero force position.

In this way, the pilot can change the reference position of the rotor with great sensitivity without changing the position proper of the control member. In general, such adjustment means are in the form of a small protuberance that can be moved in pivoting with two degrees of freedom and that is arranged close to the free end of the stick. Such adjustment means are advantageously actuated by the pilot using the thumb of the hand that is holding the control member.

In practice, the control member may include a projection of length less than 30 centimeters (cm) between a free end of the projection and a hinge giving the projection at least one degree of freedom to move in rotation relative to a stand.

A projection having such a length is well optimized for enabling the control members to be ergonomically positioned in the cockpit. Furthermore, such a length makes it possible to guarantee good piloting sensitivity with sufficient travel of the projection in at least two opposite directions.

Furthermore, and in a particular embodiment, the hinge may impart two degrees of freedom in pivoting to the projection relative to the stand, and the at least two disjoint position ranges described by the projection may be conical in shape with different angles, the first limit values forming an angle of the first cone of the first range and the second limit values forming an exterior angle of the hollow second cone forming the second range.

In other words, the projection may form a control member such as a stick or a mini-stick for controlling the cyclic pitch of the rotorcraft. Under such circumstances, the stick is suitable for pivoting about two mutually perpendicular axes that are also perpendicular to a longitudinal direction of the stick forming an axis of revolution for the first and second cones described by the stick. The first position range of the stick thus constitutes a first cone centered about a middle position. The second position range of the stick forms a hollow cone having the same vertex as the cone of the first position range, but being located exclusively outside the first position range. In other words, the hollow in the second position range is thus formed by the first position range for the cyclic pitch stick.

The invention also provides a rotorcraft that is remarkable in that it includes a control system as described above.

The invention may also relate to a rotorcraft in which a control system serves in particular to implement a first control law over a first range of positions of the control member and a second control law over a second range of positions of the control member.

The present invention also provides a method of controlling a rotor of a rotorcraft by means of a control member. Such a control method is remarkable in that it comprises the steps consisting in:

defining at least two distinct position ranges of said control member, a first position range being defined between at least two first limit values about a zero force position of the control member, and at least one second position range being defined between at least one of said at least two first limit values and at least one second limit value; and allocating a first control law to said first position range of said control member and a second control law to said second position range of said control member, said first and second control laws being selected to be mutually distinct.

In other words, the method in accordance with the invention makes it possible to distinguish between different position ranges of the control member so as subsequently to allocate different control laws to each of the ranges. There are thus defined both a first position range between at least two first limit values and also a second position range between one of the two first limit values and a second limit value.

Furthermore, such position ranges are mutually disjoint so there is no possible overlap between them.

Advantageously, it may include a step consisting in identifying a landed state of the rotorcraft on a support.

Thus, in this method, the control law of the rotor can be adapted as a function of whether the rotorcraft is in a landed state or in flight.

Furthermore, in a particular implementation, the control laws used in flight for piloting the rotorcraft may be deactivated when it is identified that the rotorcraft is in the landed state.

In a particular implementation, the first control law may be of the type that is linear in position, with each position of the control member in the first position range corresponding to a position of the plane of the rotor.

In other words, the first control law makes it possible to control the angular positions of the plane described by the tips of the blades of the rotor relative to a drive plane that is perpendicular to the shaft of the rotor. In addition, with the first control law, the aircraft is piloted with the strategy of reaching a target as a function of the position of the rotor.

Furthermore, the second control law is of the type that is linear in speed, with each position of the control member in the second position range may correspond to a speed of tilting a plane of the rotor.

Under such circumstances, the second control law enables the angular tilting speed of the plane described by the tips of the blades of the rotor to be controlled relative to a drive plane perpendicular to the shaft of the rotor. In addition, with this second control law, the aircraft is piloted with the strategy of reaching a target as a function of the speed of tilting of the plane of the rotor.

In practice, at least one second limit value may be selected in such a manner that it coincides with a physical abutment of the control member.

In other words, the second position range extends between one of the first limit values and a physical abutment of the control member. Thus, the method in accordance with the invention makes it possible to define two position ranges for the control member.

Advantageously, two second limit values may be defined for the second position range of the control member, and the second position range of the control member may be formed by two range portions, the two range portions being arranged on respective sides of the first position range of the control member.

Under such circumstances, the method consists in defining the second position range in two opposite directions along a single axis. The first position range constitutes a central range between the two portions of the second position range.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

As mentioned above, the invention relates to a system for controlling a rotorcraft rotor.

Figure 1:
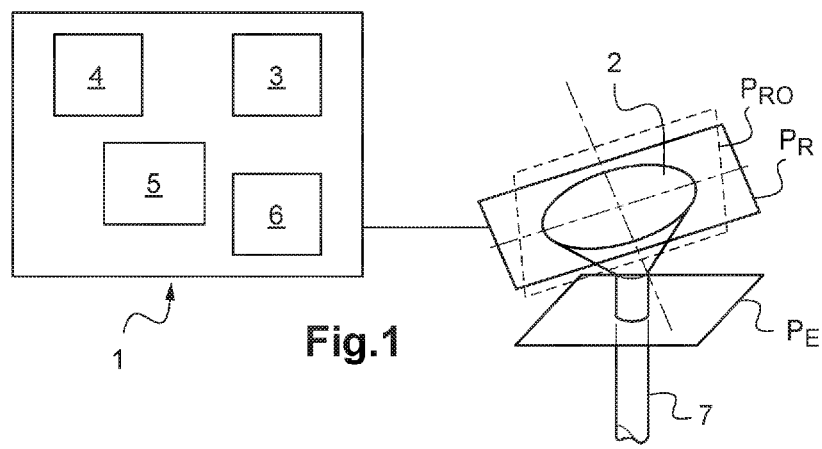
FIG. 1 is a diagrammatic view of a control system including a control member in a first embodiment in accordance with the invention.

As shown in FIG. 1, such a control system 1 comprises at least one control member 3 that may be in various forms, and in particular in the forms of a stick, a mini-stick, a joystick, or pedals. Such a control member 3 thus serves to control the collective pitch and/or the cyclic pitch of blades of a main rotor and/or of a tail rotor of a rotorcraft. Below, in order to simplify the description, reference is thus made merely to a rotor 2 without being limited to one or the other of these possibilities.

Furthermore, such a control system 1 also includes selector means 4 serving to define disjoint position ranges for the control member 3. A first position range generally includes a zero force position for the control member in which the forces on the control member 3 are low or zero. A second range of positions is remote from the zero force position of the control member and is in the proximity of or includes a physical abutment of the control member 3.

In addition, the control system 1 includes control means 5 suitable for imparting mutually distinct control laws to each of the two position ranges of the control member 3.

Finally, the control system 1 includes monitor means 6 serving to identify a landed state of the rotorcraft. Such monitor means generally incorporate sensors suitable for identifying the resultant force of the ground on landing gear of the rotorcraft. By way of example, for the range of rotorcraft sold by the Applicant, such a landed state of the rotorcraft thus corresponds to a measured force of several thousands of Newtons.

As shown, and by way of example, such a control system 1 serves to modify a tilt angle of a plane $P_R$ of the rotor 2 relative to a drive plane $P_E$ that is perpendicular to a rotor shaft 7. The plane $P_R$ of the rotor 2 has a reference position $P_{R0}$, and when the pilot actuates the control member 3 that can then cause the rotor 2 to tilt, enabling the rotorcraft to change direction and/or to modify its travel speed.

Figure 5:
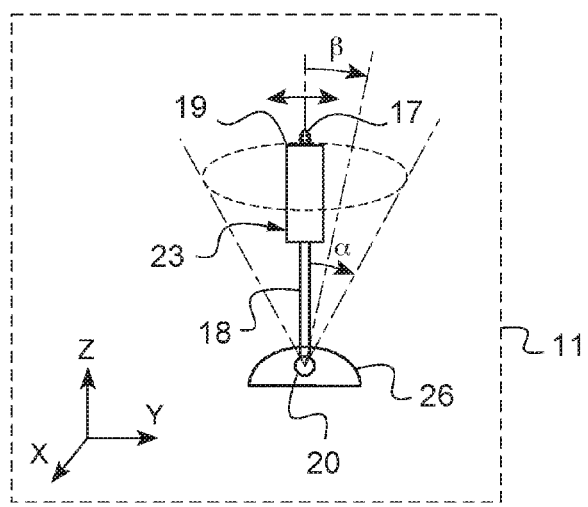
FIG. 5 is a perspective view of a control member in a second embodiment in accordance with the invention.

As shown in FIG. 5, in a second embodiment, the control member 3 may be in the form of a stick or a mini-stick for controlling the cyclic pitch of the blades of the rotor.

Figure 2:
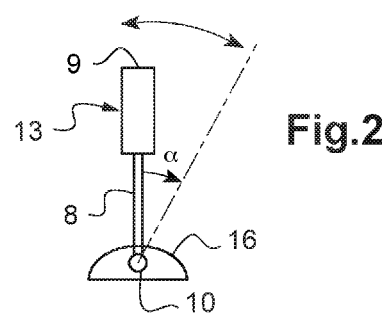
FIG. 2 is a side view of a control member in a first embodiment in accordance with the invention.

Nevertheless, in a first embodiment as shown in FIG. 2, the control member 13 may be suitable for controlling the collective pitch of a rotor. Under such circumstances, the control member 13 has a hinge 10 providing a projection 8 with one degree of freedom to move in rotation relative to a stand 16. Such a hinge 10 thus enables a free end 9 of the projection 8 to describe a movement in rotation through an angle $\alpha$ relative to a zero force position of the control member 13, and in a plane that is substantially perpendicular to the plane on which the stand 16 is secured.

In the first embodiment, the projection 8 may form a collective pitch lever for a rotor. Under such circumstances, the free end 9 of the projection 8 may move in two opposite directions along the same arc.

Figure 3:
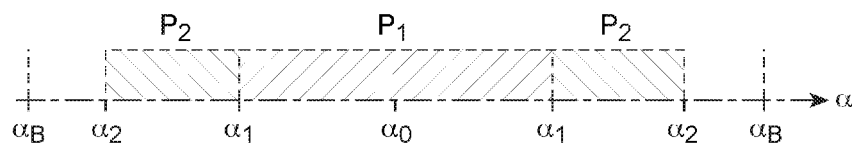
FIGS. 3 and 4 are diagrams showing different graphical representations of ranges of positions corresponding to two schemes for a control member in accordance with the first embodiment of FIG. 2.

As shown diagrammatically in FIG. 3, in a first scheme, the positions of the control member 13 can then correspond to the values for the angle a plotted along a horizontal abscissa axis representing variations in the angle of the control member 13 relative to the stand 16. Thus, as shown, over the entire stroke of the control member 13 it is then possible to define two position ranges $P_1$ and $P_2$ that are mutually distinct, i.e. that do not have any overlap.

The first range $P_1$ then lies between two first limit values $\alpha_1$ and it includes a zero force position $\alpha_0$ for the control member 13. The second range $P_2$ in this embodiment is made up of two range portions arranged on either side of the first range $P_1$. Each portion of the second range $P_2$ then lies between a first limit value $\alpha_1$ and a second limit value $\alpha_2$. As shown, the control member 13 also has two physical abutments of positions $\alpha_B$ which, as shown, need not coincide with any of the first and second limit values.

Figure 4:
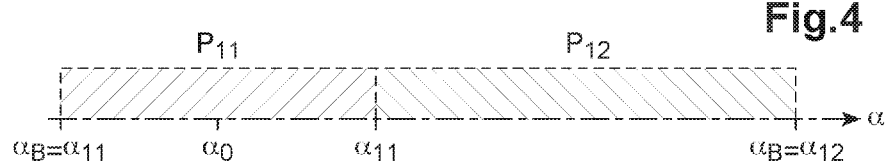

In contrast, in a second scheme as shown in FIG. 4, it is also possible to cause the physical abutments of the control member 13 to correspond with the first and second limit values for each position range.

Specifically, one of the two first limit values $\alpha_{11}$ of the first position range $P_{11}$ may correspond with one of two physical position abutments $\alpha_B$. Likewise, the second limit value $\alpha_{12}$ of the second position range $P_{12}$ may correspond with the other physical position abutments $\alpha_B$.

Furthermore, under such circumstances, the second range $P_{12}$ is in a single piece, i.e. it is not subdivided into a plurality of portions arranged on either side of the first range $P_{11}$ that incorporates a zero force position $\alpha_0$ of the control member 13.

As already mentioned above, and as shown in FIG. 5, the control system 11 may comprise a control member 23 for controlling the cyclic pitch of the blades of a rotorcraft rotor. Such a control member 23 then comprises a projection 18 that is movable in rotation relative to a stand 26 with two degrees of freedom. Such a projection 18 thus forms a stick or a mini-stick for controlling the cyclic pitch of the blades of a rotor.

The axes of rotation of the hinge 20 thus lie in a plane xOy and they are mutually perpendicular. Such a projection 18 is thus free to pivot with two angles $\alpha$ and $\beta$ representative of different positions of the control member 23 and of different paths followed by the free end 19 of the projection 18. Under such circumstances, the positions of the control member 23 can be defined by coordinates $(\alpha, \beta)$. Consequently, a graphical representation of the positions of the control member 23 may, as shown in FIGS. 6 and 7, consist in areas with an abscissa axis representing angular variations $\alpha$ of the control member and with an ordinate axis representing angular variations $\beta$ of the control member.

Under such circumstances, the limit values of the positions of the control member and enabling at least two position ranges to be defined form conical bodies of revolution.

Figure 6:
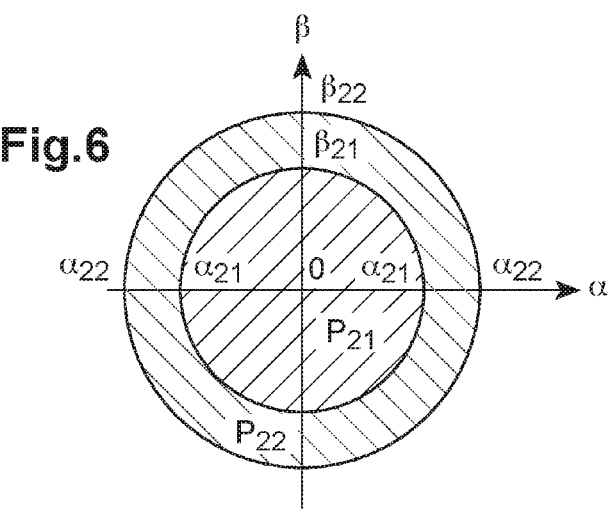
FIGS. 6 and 7 are diagrams showing different graphic representations of ranges of positions corresponding to the control member in accordance with the second embodiment of FIG. 5.
Figure 7:
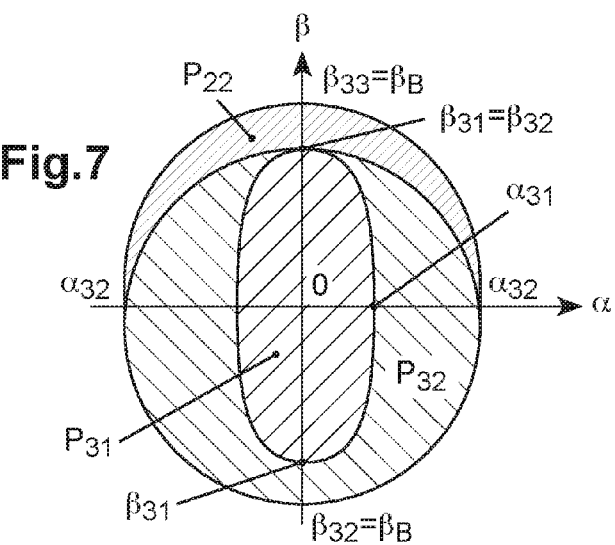

Nevertheless, as shown in FIG. 6, it is more explicit to provide a graphical representation of the various positions of the control member 23 in the form of surfaces that are disjoint but juxtaposed, and representative of position ranges $P_{21}$ and $P_{22}$ of the member.

Thus, as shown, the surface representative of the first range $P_{21}$ is in the form of a disk of center of and of radius $\alpha_{21}$ or $\beta_{21}$ corresponding to the first limit values for the positions of the control member 23 respectively along the axes $\alpha$ and $\beta$. Likewise, the surface representative of the second range $P_{22}$ is in the form of a circular ring of center O and of radius lying between $\alpha_{21}$ and $\alpha_{22}$ corresponding respectively to the first limit value for the first range and the second limit value for the second range.

Naturally, and as shown in FIG. 7, the first limit values $\alpha_{31}$ and $\beta_{31}$ corresponding to two distinct axes need not necessarily be equal to each other. Consequently, the surface representative of the first range $P_{31}$ may be in the form of an ellipse of center O. Under such circumstances, the first limit value $\alpha_{31}$ is less than the first limit value $\beta_{21}$.

Furthermore, the surface representative of the second area $P_{32}$ is of any non-symmetrical shape when the center of its outline does not coincide with the center of the surface representative of the first range $P_{31}$. In such a configuration, one of the first limit values $a_{31}$ coincides with a second limit value $\beta_{32}$. Nevertheless, the other second limit value $\beta_{32}$ is greater than the opposite first limit value $\alpha_{31}$. Furthermore, and as shown, this second limit value $\beta_{32}$ may coincide with the physical abutment of the control member 23.

As shown in FIG. 7, the graphical representation of the various positions of the control member 23 may include a third surface that is disjoint from the first and second surfaces, this third surface thus being representative of a third position range $P_{31}$ for the control member 23.

As shown, and as above for the second surface, this third surface lies between a second limit value $\beta_{32}$ and a third limit value $\beta_{33}$ which, in this example, coincides with a physical abutment $\beta_B$.

Such a surface is then crescent-shaped since it extends in only one direction along the axis $\beta$ and since the third limit values $\alpha_{33}$ along the axis $\alpha$ coincide with the second limit values $\alpha_{32}$ of the second position range $P_{32}$ of the control member 23.

Furthermore, and as shown in FIG. 5, the control member 23 may include adjustment means 17 arranged at the free end 19 of the projection 18.

Such adjustment means 17 then enable the anchor position of the control member to be adjusted with great accuracy. Such adjustment is generally formed using the pilot's thumb and it provides great control sensitivity.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A control system for controlling a rotorcraft rotor, the control system comprising at least one control member for use in piloting the rotor,
   the control system further comprising:
   selector means for defining at least two disjoint position ranges and for the control member between two physical abutments corresponding to the movement limits of the control member,
   a first position range being defined between at least two first limit values about a zero force position of the control member, and
   at least one second position range being defined between at least one of the at least two first limit values and at least one second limit value; and
   control means for allocating a first control law to the first position range of the control member and a second control law to the second position range of the control member, the first and second control laws being selected to be mutually distinct.

2. A control system according to claim 1, wherein the control system includes monitor means allowing to identify a landed state of the rotorcraft on a support.

3. A control system according to claim 1, wherein the first control law is of the type that is linear in position, each position of the control member in the first position range corresponding to a position of a plane of the rotor.

4. A control system according to claim 1, wherein the second control law is of the type that is linear in speed, each position of the control member in the second position range corresponding to a speed of tilt of a plane of the rotor.

5. A control system according to claim 1, wherein the at least one second limit value coincides with one of the two physical abutments of the control member.

6. A control system according to claim 1, wherein the second position range of the control member comprises two range portions, each of the two range portions being defined between one of the at least two first limit values of the first range and one of the at least one second limit values, the two second portions of the second position range being arranged on respective sides of the first position range of the control member.

7. A control system according to claim 1, wherein the control system includes adjustment means suitable for modifying a reference position of a plane of the rotor relative to a drive plane, the reference position corresponding to an angle of inclination of the rotor when the control member is in the zero force position.

8. A control system according to claim 1, wherein the control member includes a projection of length less than 30 cm between a free end of the projection and a hinge giving the projection at least one degree of freedom to move in rotation relative to a stand.

9. A control system according to claim 8, wherein the hinge imparts two degrees of freedom to the projection to move in rotation relative to the stand, and wherein the at least two disjoint position ranges and described by the projection are in the form of cones with different angles, the at least two first limit values forming an angle of a first cone forming the first range and the at least one second limit value forming an exterior angle of a hollow second cone forming the second range.

10. A rotorcraft, including at least one control system according to claim 1.

11. A method of controlling a rotorcraft rotor by means of a control member, wherein the method comprises the steps of:
   defining at least two distinct position ranges and of the control member, a first position range being defined between at least two first limit values about a zero force position of the control member, and at least one second position range being defined between at least one of the at least two first limit values and at least one second limit value; and
   allocating a first control law to the first position range of the control member and a second control law to the second position range of the control member, the first and second control laws being selected to be mutually distinct.

12. A method according to claim 11, wherein the method includes a step of identifying a landed state of the rotorcraft on a support.

13. A method according to claim 11, wherein the first control law being of the type that is linear in position, with each position of the control member in the first position range corresponds to a position of a plane of the rotor.

14. A method according to claim 11, wherein the second control law being of the type that is linear in speed, with each position of the control member in the second position range corresponds to a speed of tilting a plane of the rotor.

15. A method according to claim 11, wherein at least one second limit value is selected in such a manner that it coincides with a physical abutment of the control member.

16. A method according to claim 11, wherein two second limit values are defined for the second position range of the control member, and wherein the second position range of the control member is formed by two range portions, the two range portions being arranged on respective sides of the first position range of the control member.

* * * * *